United States Patent [19]

Moriyama et al.

[11] Patent Number: 4,602,319
[45] Date of Patent: Jul. 22, 1986

[54] RETRACTABLE HEAD-LIGHT DEVICE FOR AUTOMOBILES

[75] Inventors: Naomune Moriyama; Fumiyuki Ohtani, both of Hiroshima, Japan

[73] Assignee: Mazda Motor Corporation, Hiroshima, Japan

[21] Appl. No.: 780,717

[22] Filed: Sep. 27, 1985

Related U.S. Application Data

[63] Continuation of Ser. No. 599,559, Apr. 12, 1984, abandoned.

[30] Foreign Application Priority Data

Apr. 15, 1983 [JP]  Japan .................................. 58-67490
Apr. 15, 1983 [JP]  Japan .................................. 58-67491
Apr. 15, 1983 [JP]  Japan ............................. 58-57075[U]

[51] Int. Cl.⁴ ............................................. B60Q 1/06
[52] U.S. Cl. ...................................... 362/65; 362/66; 362/82; 362/83; 362/287
[58] Field of Search ........................ 362/61, 64, 65, 66, 362/80, 82, 83, 269, 275, 285, 287, 420, 428; 248/134, 147; 403/145, 146, 147; 74/96, 99 A, 99 R; 49/40, 41, 236, 238; 296/1 R; 16/367, 351, 341, 342, 325, 321, 287, 333

[56] References Cited

U.S. PATENT DOCUMENTS

| | | | |
|---|---|---|---|
| 475,338 | 5/1892 | Oliver | 49/236 X |
| 475,415 | 5/1892 | Porter | 16/351 |
| 1,622,617 | 3/1927 | Thurman | 16/342 |
| 3,264,786 | 8/1966 | Nettles | 49/236 X |
| 3,387,125 | 6/1968 | Ingolia | 362/65 |
| 3,526,764 | 9/1970 | Klie et al. | 362/65 |
| 3,532,872 | 10/1970 | Hall | 362/65 |
| 3,594,853 | 7/1971 | Slattery | 16/367 X |
| 4,186,905 | 2/1980 | Brudy | 16/342 X |
| 4,246,628 | 1/1981 | Ikemizu et al. | 362/65 |
| 4,282,561 | 8/1981 | Yano | 362/65 |
| 4,285,165 | 8/1981 | Persson | 49/238 X |
| 4,337,548 | 7/1982 | Bonar | 16/367 X |
| 4,471,410 | 9/1984 | Nakano | 362/420 X |

FOREIGN PATENT DOCUMENTS 2099974 12/1982 United Kingdom .................. 362/66

Primary Examiner—Richard E. Gluck
Attorney, Agent, or Firm—Fleit, Jacobson, Cohn & Price

[57] ABSTRACT

A retractable automobile head-light device including a retractable head lamp mounted through a linkage for movement between a retracted position and an extended position. The lamp cover has a front edge inclined rearwards toward laterally outwards so as to conform to the contour of the automobile body. A lamp cover panel is mounted at the rear end portion on the automobile body for vertical movements and twisting movements about a substantially laterally extending swinging axis. A lamp cover driving mechanism includes a pair of driving links each connected at one end to the lamp cover panel through a lug and at the other end to the linkage so that the lamp cover is swingably moved together with the movement of the head lamp between the extended and retracted positions. The swinging axis is inclined either or both upwards and rearwards toward laterally outward so that the front edge of the lamp cover panel is maintained substantially horizontally even though there is a downward inclination towards outwards in the body contour.

10 Claims, 13 Drawing Figures

RETRACTABLE HEAD-LIGHT DEVICE FOR AUTOMOBILES

This application is a continuation of application Ser. No. 599,559, filed Apr. 12, 1984, now abandoned.

The present invention relates to an automobile head-light device and more particularly to a retractable head-light device. More specifically, the present invention pertains to a retractable head-light device in which the head lamp is oriented in the same direction in the retracted position as in the extended or projected position.

In automobile industry, in an attempt to make the car body surfaces as flush as possible to thereby improve aeronautical properties, retractable head-light devices have been developed and are going to be widely used. Conventional retractable head-light devices have head lamps mounted on vertically swingable members on car bodies and lamp covers are provided above the head lamps so that they are swung together with the head lamps.

For example, the United Kingdom published patent application No. 2099974 proposes an automobile head-light device wherein the head lamp is supported by a parallel link mechanism so that it can be moved in parallelism between the extended and retracted positions maintaining a forwardly directed orientation. This type of arrangement is advantageous in that in the retracted position, light warning signals can be emitted through for example, slits or a transparent plate which may appropriately provided on the body. There is described that the parallel link mechanism is driven by an electric motor through a crank mechanism. The U.K. patent application further discloses a lamp cover panel provided above the head lamp to provide a flush body surface in the retracted position. In the drawings of the U.K. patent application, it seems that the lamp cover is hinged at the rear end portion to the carbody and connected at the forward end portion through a link to the forward end portion of the link mechanism. It should however be pointed out that this driving mechanism can present problems of appearance due to a specific contour of the car body in an area where the head-light device is installed.

Describing in more detail, an automobile body has a front portion which is of a configuration wherein the front end portion is curved rearwards toward laterally outwards. In an automobile body of such configuration, if the lamp cover is so designed that its front edge is curved substantially in parallel with the front end contour of the body or with the front bumper as seen a top plan view, the front edge of the lamp cover extends substantially horizontally as seen in a front view giving a good appearance. It should however be noted that in this design, the front edge of the lamp cover will be drooped laterally outwards in the extended position of the head-light device because the inboard end of the front edge is raised to a higher level than the outboard end. Where the head lamp has a substantially rectangular configuration, there will therefore be produced an unmatched appearance between the front edge of the lamp cover and the upper edge of the head lamp. It should further be noted that the front edges of the lamp covers in the head-light devices at the opposite sides of the body define a downwardly divergent configuration, and this will give the front body with a slovenly appearance.

It is therefore an object of the present invention to provide a retractable head-light device in which the head lamp cover can offer good appearances both in the retracted and extended positions.

Another object of the present invention is to provide an automobile head-light device in which the lamp cover can be moved to the extended position with the front edge maintained substantially horizontally.

According to the present invention, the above and other objects can be accomplished by a head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means and having a front edge inclined rearwards toward laterally outwards, cover mounting means for mounting said lamp cover means on the body for vertical swinging movement between a retracted position wherein it covers the opening means in the body and an extended position wherein it is projected above the contour of the body, cover driving means for driving said lamp cover means so that it is moved together with the head lamp means, said cover mounting means including means for providing a swinging axis below a rear part of said lamp cover means, said swinging axis extending substantially laterally of the body with an upward inclination toward laterally outwards. Alternatively or in addition, the swinging axis may be inclined with respect to a lateral line of the body in the same direction as an inclination of the front edge of the lamp cover means.

The lamp mounting means may include parallel link mechanism so that the head lamp means be moved between the aforementioned two positions in parallelism maintaining the forwardly directed orientation. The cover driving means may include link means connecting the lamp cover means with either the parallel link mechanism on the head lamp means.

The above and other objects and features of the present invention will become apparent from the following descriptions of preferred embodiments taking reference to the accompanying drawings, in which.

Figure 2:
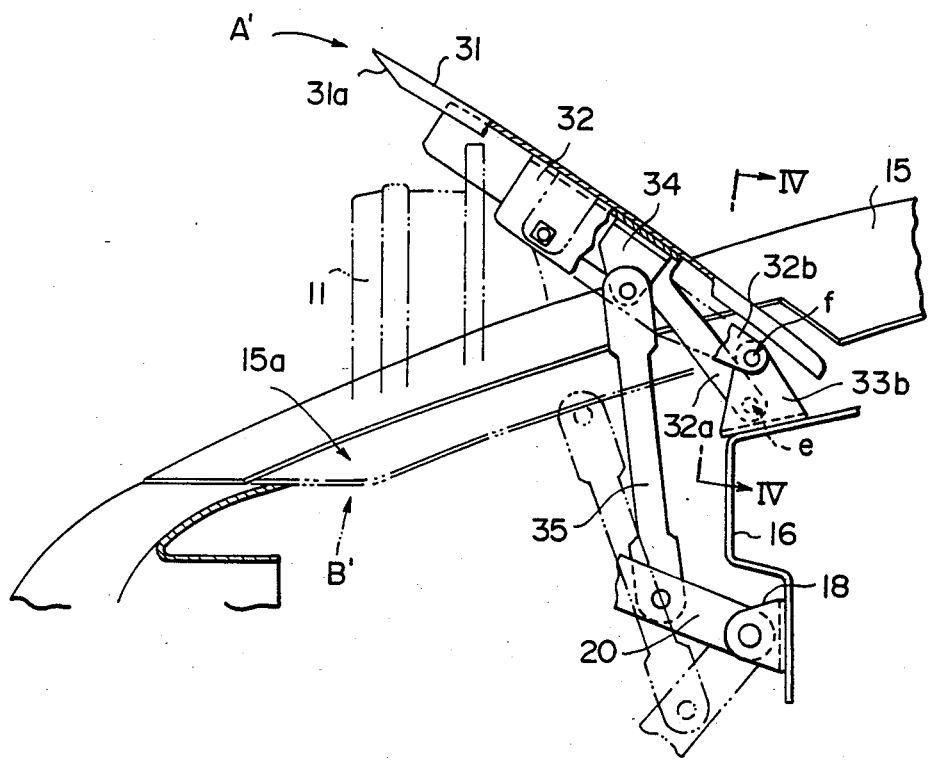
FIG. 2 is a fragmentary sectional view showing the lamp cover driving mechanism adopted in the embodiment shown in FIG. 1.
Figure 5:
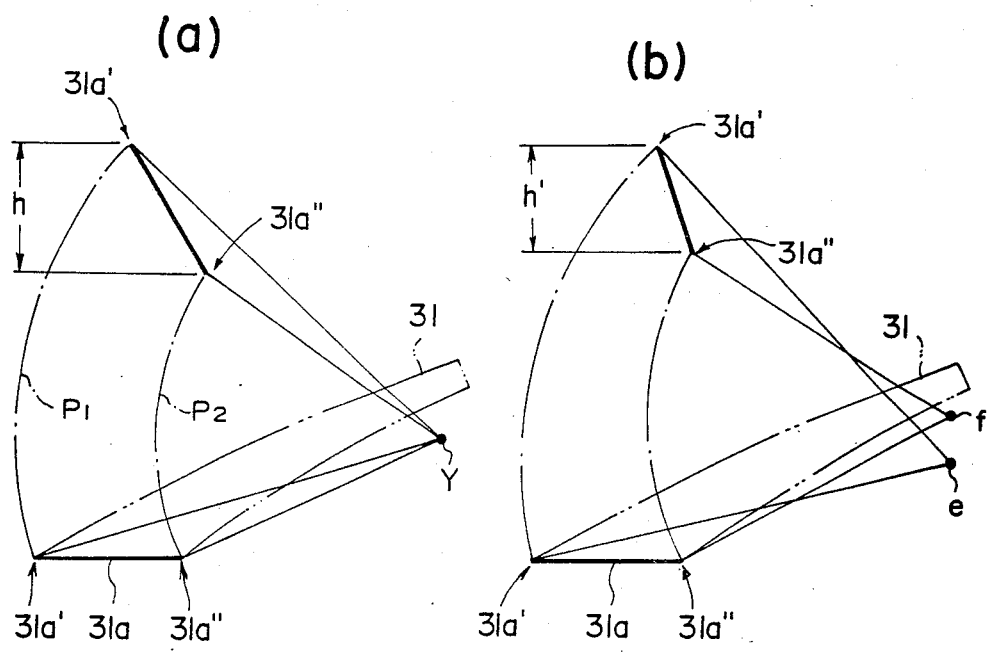
Figure 6:
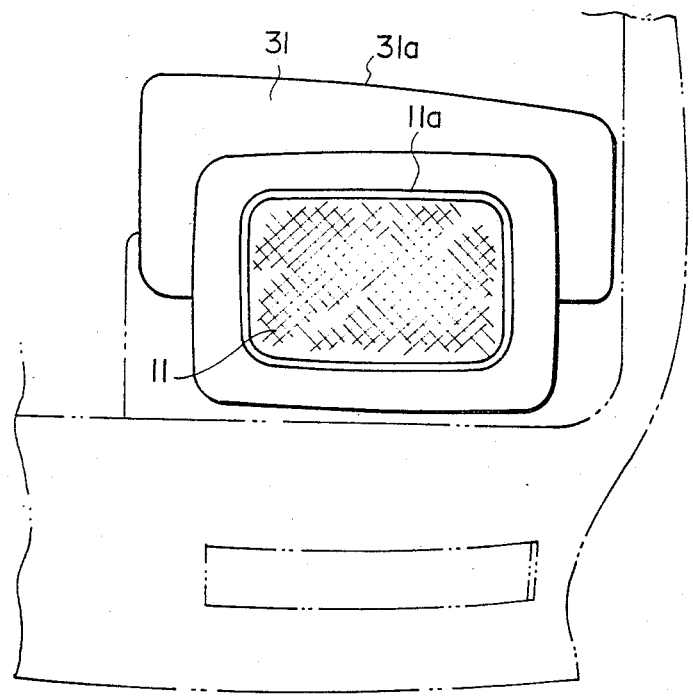
Figure 7:
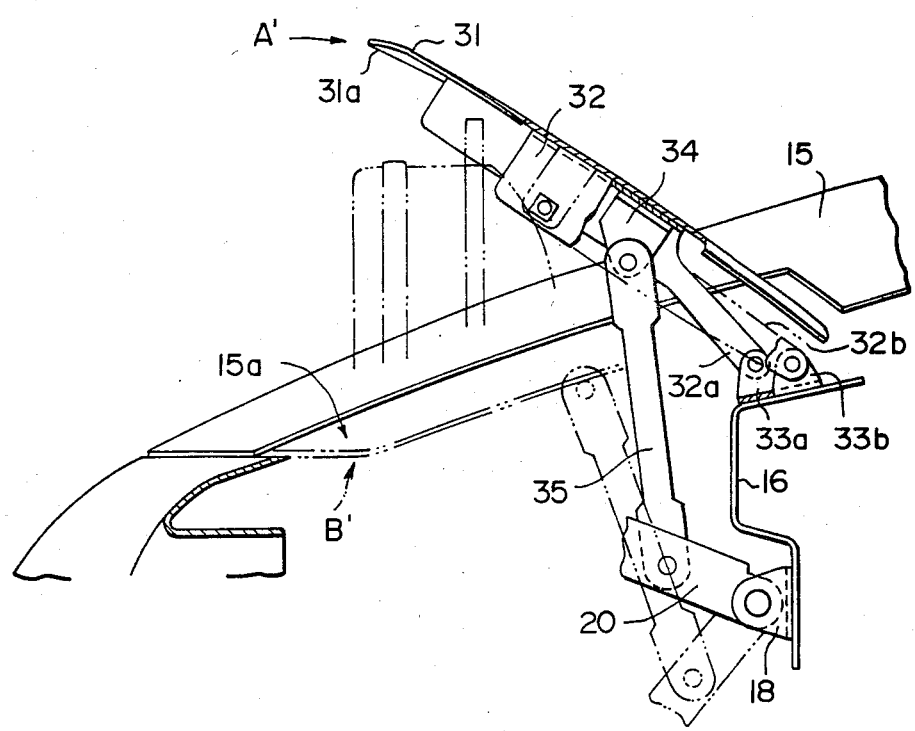
Figure 8:
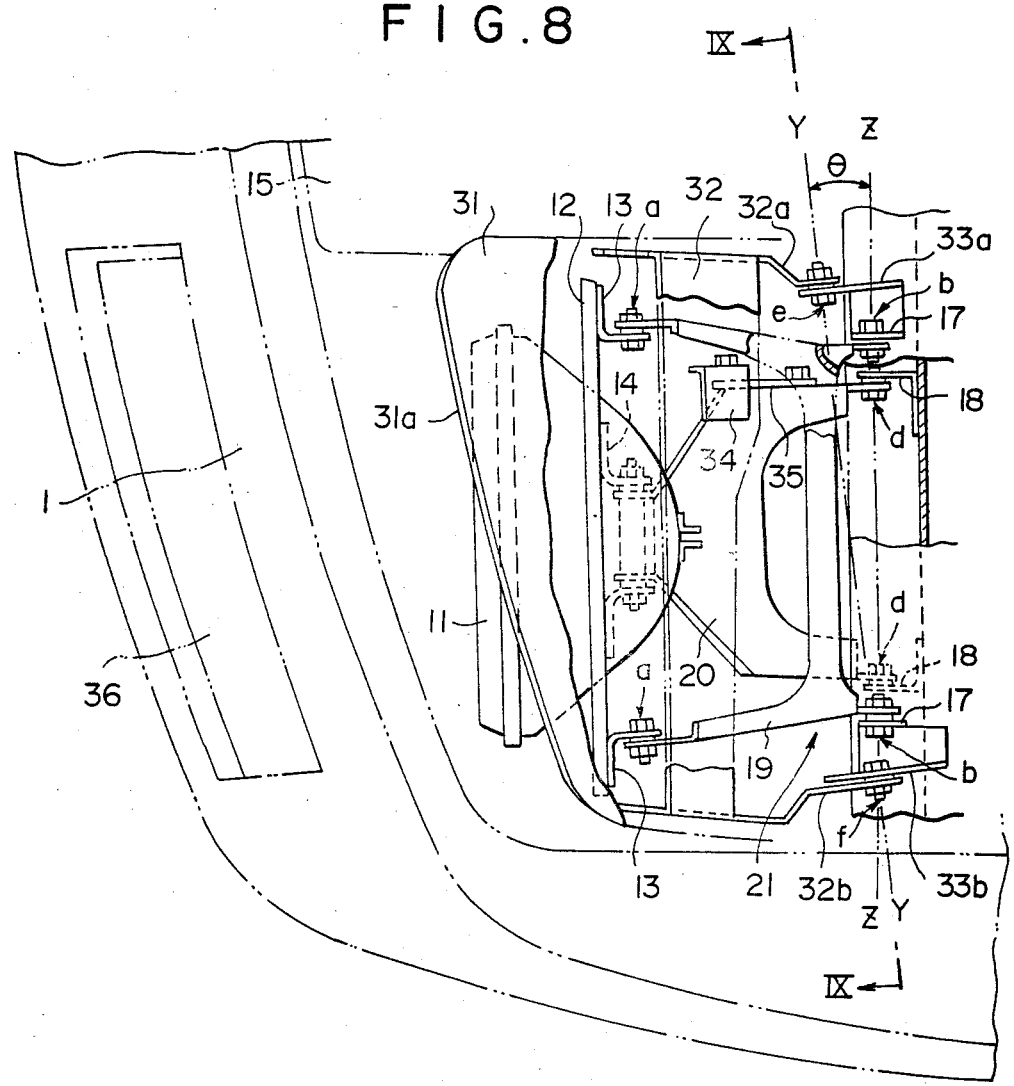
Figure 9:
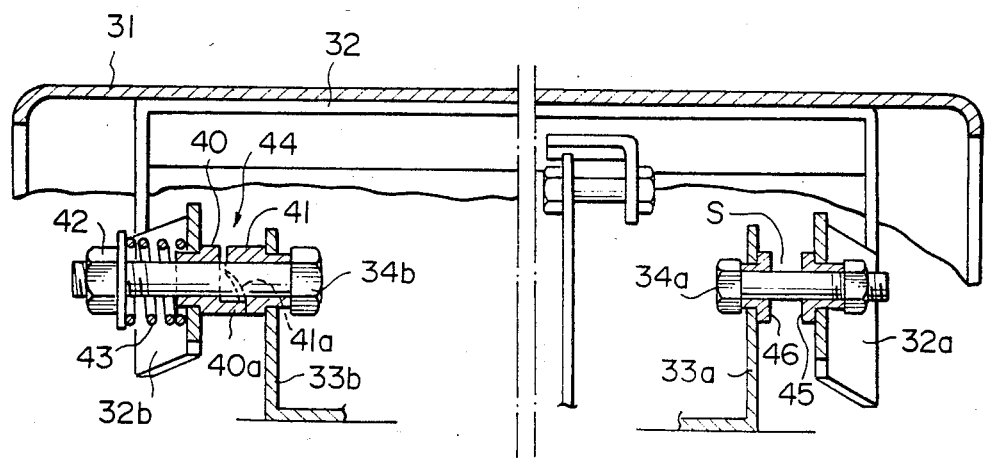
Figure 10:
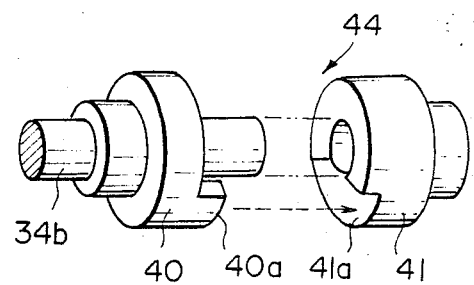
Figure 11:
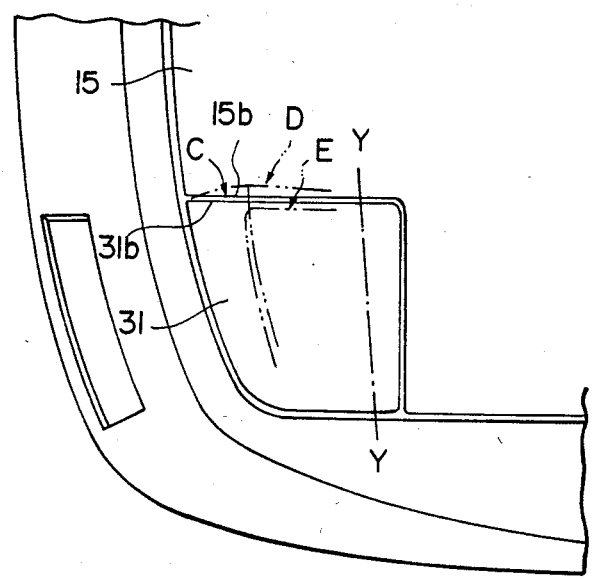
Figure 12:
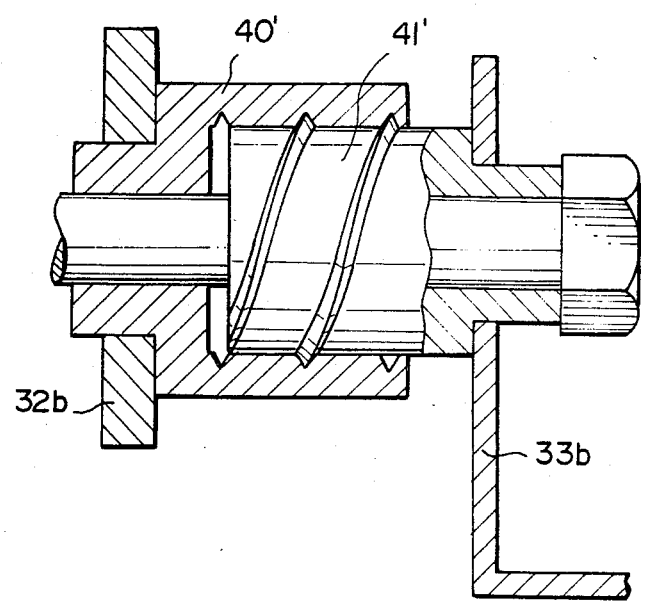

FIGS. 5(a) and (b) are diagrammatical illustrations of movements of the lamp cover panel respectively in prior art and in the present invention;

FIG. 6 is a fragmentary front view of the head-light device;

FIG. 7 is a fragmentary sectional view similar to FIG. 2 but showing another embodiment;

FIG. 8 is a partially cut-away plan view of the embodiment shown in FIG. 7;

FIG. 9 is a sectional view taken along the line IX—IX in FIG. 8;

FIG. 10 is a perspective view of the cam assembly adopted in the mechanism shown in FIG. 9;

FIG. 11 is a fragmentary plan view showing a sideward shifting of the head lamp cover; and FIG. 12 is a sectional view of a screw assembly which can be used in substitute of the cam assembly shown in FIG. 10.

Figure 1:
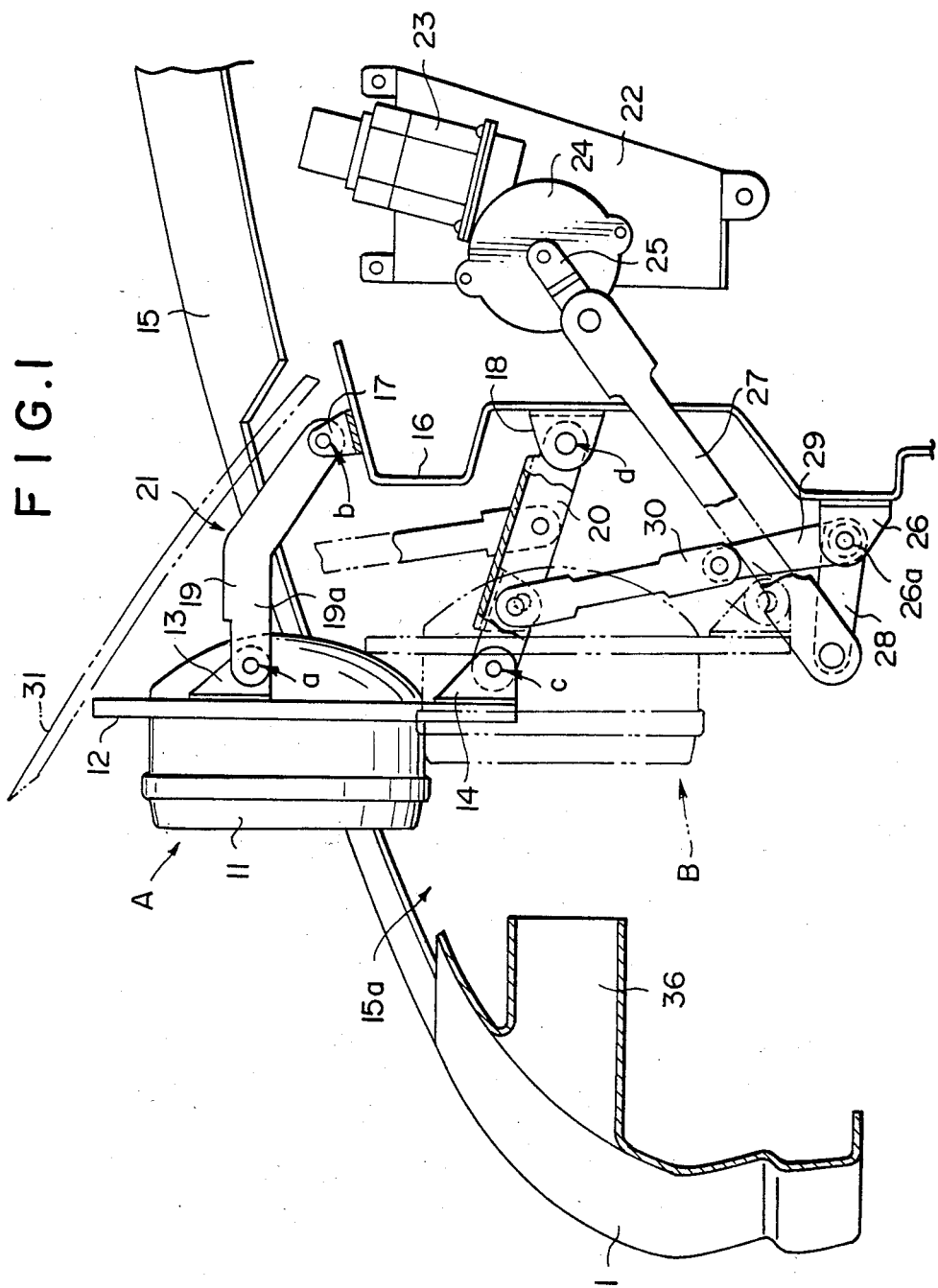
FIG. 1 is a fragmentary vertical section of an automobile front body showing a head-light device in accordance with one embodiment of the present invention.
Figure 3:
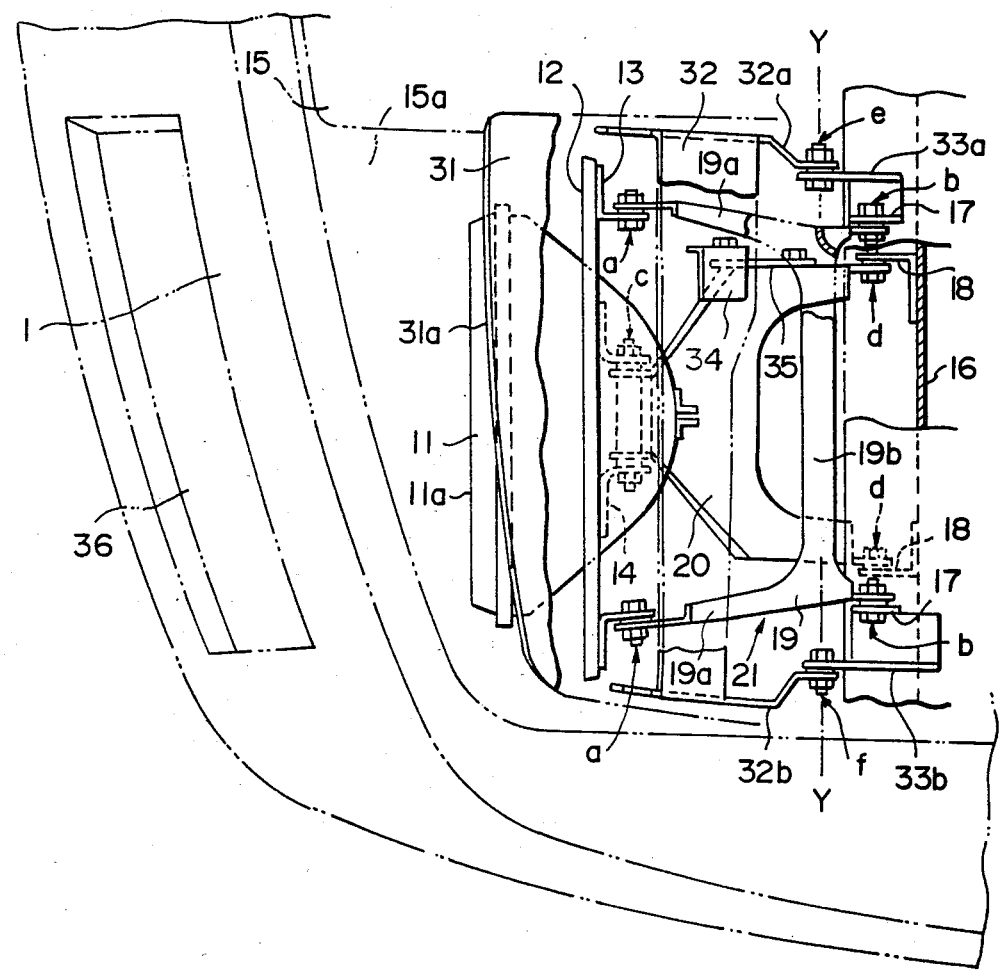
FIG. 3 is a partially cut-away plan view of the head-light device.

Referring now to the drawings, particularly to FIGS. 1 through 3, there is shown a head-light device for an automobile which includes a head lamp 11 having a bracket plate 12 secured thereto. The bracket plate 12 is provided at the opposite sides of a vertically intermediate portion with a pair of upper brackets 13 and at the lower edge portion with a pair of lower brackets 14. The automobile has a body 1 provided with a lamp supporting frame 16 carrying a pair of upper brackets 17 and a pair of lower brackets 18. An upper link 19 having a pair of link arms 19a and a connecting bar between the pair of link arms 19a is provided and connected at one ends of the respective link arms 19a with the respective upper brackets 13 on the bracket plate 12 at the pivot points a and at the other ends of the respective link arms 19a with the respective brackets 17 on the frame 16 at the pivot points b. A bifurcated lower link 20 is connected at one end with the lower brackets 14 on the bracket plate 12 at the pivot point c and at the ends of bifurcated arms respectively with the lower brackets 18 on the frame 16 at the pivot points d. As seen in the side view in FIG. 1, an imaginary line passing through the pivot points a and b is parallel with an imaginary line passing through the pivot points c and d so that the links 19 and 20 form a parallel link mechanism 21. Thus, the head lamp 11 is moved as the links 19 and 20 swing vertically between an extended position shown by A in FIG. 1 and a retracted position.

The automobile body 1 has a bonnet 15 covering an engine compartment as well known in the art and the bonnet 15 is cut-off at each front corner to provide an opening 15a. In the extended position, the head lamp 11 is projected above the contour of the body 1 through this opening 15a. In the retracted position, the head lamp 11 is retracted within the contour of the body 1. The body 1 is formed with a slit or an opening 36 positioned in front of the head lamp 11 in the retracted position so that the illuminating light beam is projected forwards through the slit 36.

Beneath the parallel linkage 21, the frame 16 has a further bracket 26 which rotatably carries a shaft 26a. Secured to the shaft 26a is a crank comprised of crankarms 28 and 29. The crankarm 28 is connected through a link 27 with a crankarm 25 provided on the output shaft of a speed reduction gear device 24. The gear device 24 is arranged so that it is driven by an electric motor 23 mounted on a mounting plate 22. The crankarm 29 is connected with a link 30 which is in turn connected with the lower link 20. It will therefore be understood that an operation of the motor 23 causes a rotation of the crank comprised of the crankarms 28 and 29 which then actuate the parallel link mechanism 21 in a vertical direction. Thus, the head lamp 11 is moved vertically between the projected position A and the retracted position B.

As shown in FIGS. 1 and 2, a lamp cover panel 31 is provided above the head lamp 11. On the lower side of the lamp cover panel 31, there is attached a link plate 32 which is provided at the opposite sides with a pair of rearwardly extending link arms 32a and 32b. The frame 16 has a pair of brackets 33a and 33b which are respectively connected with the free ends of the link arms 32a and 32b, respectively through hinge pins e and f. The hinge pins e and f define a laterally extending swinging axis Y—Y so that the cover panel 31 is movable between a retracted position wherein it closes the opening 15a as shown by phantom lines B' in FIG. 2 and an extended position wherein it is upwardly swung as shown by solid lines A'. The lamp cover panel 31 is further provided with a bracket 34 which is connected with one end of the link 35. The other end of the link 35 is connected with the lower link 20. It will therefore be understood that the lamp cover panel 31 is moved through the link 35 in response to a movement of the head lamp 11.

Figure 4:
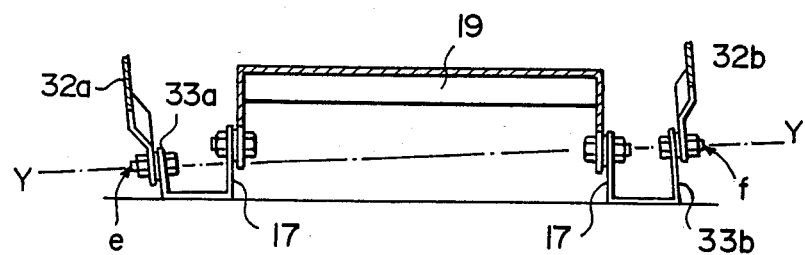
FIG. 4 is a sectional view taken substantially along the line IV—IV in FIG. 2.

In FIG. 3, it will be noted that the automobile body 1 has a front end which is inclined rearwards toward laterally outwards. The lamp cover panel 31 has a correspondingly inclined front edge 31a. The front edge 31a of the lamp cover panel 31 is therefore formed so that it lies substantially horizontally in the retracted position. If the swinging axis Y—Y of the lamp cover panel 31 is horizontal, the front edge 31a of the lamp cover panel 31 will be sidewardly inclined to a substantial degree when the panel 31 is moved to the extended position. Referring to FIG. 5(a), the laterally inboard end 31a' of the front edge is moved along an arcuate path $P_1$ having a center of arm on the axis Y, as shown whereas the outboard end 31a'' is moved along an arcuate path $P_2$ producing a height difference h which is caused by a difference in the distances between the axis Y and the respective ends 31a' and 31a''. According to the embodiment, however, the swinging axis Y—Y is inclined upwards toward laterally outwards as shown in FIG. 4. Thus, the inboard pivot point e is lower in level than the pivot point f. Therefore, the heightwise difference between the ends 31a' and 31a'' of the front edge 31a in the extended position can be decreased as shown by h' in FIG. 5(b). It will therefore be understood that the front edge 31a of the cover panel 31 can be maintained substantially in parallel with the upper edge 11a of the head lamp 11.

Referring now to FIGS. 7 and 8, the embodiment shown therein is different from the previous embodiment in that the bracket 33a which is connected with the inboard link 32a of the link plate 32 is forwardly offset with respect to the bracket 33b connected with the outboard link 32b. Thus, the swinging axis Y—Y defined by the pivot points e and f is inclined rearwards toward laterally outwards by an angle $\theta$ with respect to a hinge axis Z—Z of the parallel linkage 21. This arrangement is also effective to prevent the front edge 31a of the lamp cover panel 31 from being significantly inclined in the extended position. It should however be noted that in this arrangement the inboard edge of the lamp cover panel 31 will be laterally inwardly displaced when the cover panel 31 is moved from the retracted position to the extended position. This will cause an interference with the bonnet 15 when it is desired to open the bonnet 15 with the head lamp 11 in the extended position.

In order to avoid the problem, the links 32a and 32b are connected with the brackets 33a and 33b through a mechanism as shown in FIG. 9. Describing in more detail, the inboard link 32a has a bushing 45 at the free end and the bracket 33a has a bushing 46. The bracket 33a is located laterally outwards with respect to the link 32a and connected thereto by a bolt 34a inserted through the bushings 45 and 46. A spacing s is provided between the bushings 45 and 46 so that the link 32a can be moved laterally outwards with respect to the bracket 33a.

The outboard link 32b has a cam 40 secured thereto and the outboard bracket 33b is also secured with a cam 41. A bolt 34b is inserted through the cams 40 and 41 and fitted with a nut 42. The bracket 33b is located laterally inwards with respect to the link 32b. A compression spring 43 is provided to act between the nut 42 and the link 32b to force the link 32b laterally inwards toward the bracket 33b. The mechanism thus allows the link 32b to be shifted laterally outwards against the action of the spring 43.

The cam 40 on the link 32b has a cam profile on the lateral inboard surface whereas the cam 41 on the bracket 33b has a cam profile 41a for cooperation with the cam profile 40a as shown in FIG. 10. The cam profiles 40a and 41a are maintained in engagement under the action of the spring 43. The cam profiles 40a and 41a are so formed that when the lamp cover panel 31 is moved to the extended position the link 32b is forced laterally outwards against the action of the spring 43. It will thus be understood that the lamp cover panel 31 is shifted laterally outwards when it is moved to the extended position. Without this mechanism, the inboard edge 31b of the lamp cover panel 31 lying at the position c in the retracted position will be moved to the position D in the extended position as shown in FIG. 11. However, with the aforementioned mechanism, the inboard edge 31b will be moved for example to the position E avoiding a possible interference with the bonnet 15.

Referring to FIG. 12, the cam 40 on the link 32b is substituted by an internally threaded member 40' which is engaged with an externally threaded member 41' secured to the bracket 33b. This mechanism can provide the same function as the previously described mechanism. The mechanisms in FIGS. 9 and 10 and FIG. 12 can also be applied to the embodiment in FIGS. 1 through 6.

The invention has thus been shown and described with reference to specific embodiments, however, it should be noted that the invention is in no way limited to the details of the illustrated structures but changes and modifications may be made without departing from the scope of the appended claims.

We claim:

1. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means, cover mounting means for mounting said lamp cover means on the body for vertical swinging movement between a retracted position wherein it covers the opening means in the body and an extended position wherein it is projected above the contour of the body, said lamp cover means having a front edge which is substantially horizontal in a front view and inclined rearwards toward laterally outwards when the lamp cover means is in the retracted position, cover driving means for driving said lamp cover means so that it is moved together with the head lamp means, said cover mounting means including connecting means having one end connected with said lamp cover means and the other end connected with the body for providing a swinging axis below a rear part of said lamp cover means, said swinging axis extending substantially laterally of the body with an upward inclination toward laterally outwards such that the front edge of said cover means extends substantially horizontally in the extended position.

2. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means, cover mounting means for mounting said lamp cover means on the body for vertical swinging movement between a retracted position wherein it covers the opening means in the body and an extended position wherein it is projected above the contour of the body, said lamp cover means having a front edge which is substantially horizontal in a front view and inclined rearwards toward laterally outwards when the lamp cover means is in the retracted position, cover driving means for driving said lamp cover means so that it is moved together with the head lamp means, said cover mounting means including connecting means having one end connected with said lamp cover means and the other end connected with the body for providing a swinging axis below a rear part of said lamp cover means, said swinging axis being inclined rearwards toward laterally outwards such that the front edge of the lamp cover means extends substantially horizontally in the extended position of the lamp cover means.

3. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means, cover mounting means for mounting said lamp cover means on the body for vertical swinging movement between a retracted position wherein it covers the opening means in the body and an extended position wherein it is projected above the contour of the body, said lamp cover means having a front edge which is substantially horizontal in a front view and inclined rearwards toward laterally outwards when the lamp cover means is in the retracted position, cover driving means for driving said lamp cover means so that it is moved together with the head lamp means, said cover mounting means including connecting means having one end connected with said lamp cover means and the other end connected with the body for providing a swinging axis below a rear part of said lamp cover means, said swinging axis being inclined upwards and rearwards toward laterally outwards such that the front edge of said lamp cover means extends substantially horizontally in the extended position of the lamp cover means.

4. A head-light device in accordance with claim 1 in which said lamp mounting means includes means for mounting said head lamp means so that the head lamp means is moved maintaining a forwardly directed orientation.

5. A head-light device in accordance with claim 2 in which said cover mounting means includes sideward shifting means for shifting the lamp cover means laterally outwards when it is moved to the extended position.

6. A head-light device in accordance with claim 5 in which said shifting means includes cam means.

7. A head-light device in accordance with claim 2 in which said cover mounting means includes link means having one end secured to said lamp cover means and the other end swingably connected with bracket means on the automobile body through screw means which produces a laterally outward movement in the lamp cover means when the lamp cover means is moved to the extended position.

8. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means and having a front edge inclined rearwards toward laterally outwards, cover mounting means for mounting said lamp cover means on the body for vertical swinging movement between a retracted position wherein it covers the opening means in the body and an extended position wherein it is projected above the contour of the body, cover driving means for driving said lamp cover means so that it is moved together with the head lamp means, said cover mounting means including means for providing a swinging axis for said swinging movement below a rear part of said lamp cover means, said swinging axis being inclined upwards and rearwards toward laterally outwards such that the front edge of said lamp cover means extends substantially horizontally in the extended position of the lamp cover means, said cover mounting means including link means having one end secured to said lamp cover means and the other end swingably connected with bracket means on the automobile body through hinge pin means passing through the link means and the bracket means, and sideward shifting means including cam means provided about said hinge pin means between the link means and the bracket means for producing a laterally outward movement in the lamp cover means when the lamp cover means is moved to the extended position.

9. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means and having a front edge inclined rearwards toward laterally outwards, cover mounting means for mounting said lamp cover means on the body for vertical swinging movement between a retracted position wherein it covers the opening means in the body and an extended position wherein it is projected above the contour of the body, cover driving means for driving said lamp cover means so that it is moved together with the head lamp means, said cover mounting means including means for providing a swinging axis for said swinging movement below a rear part of said lamp cover means, said swinging axis being inclined upwards and rearwards toward laterally outwards such that the front edge of said lamp cover means extends substantially horizontally in the extended position of the lamp cover means, said cover mounting means including link means having one end secured to said lamp cover means and the other end swingably connected with bracket means on the automobile body through screw means which produces a laterally outward movement in the lamp cover means when the lamp cover means is moved to the extended position.

10. A head-light device for automobiles comprising head lamp means, lamp mounting means for mounting said head lamp means on an automobile body for movement between a retracted position wherein it is retracted within a contour of the body and an extended position wherein it is projected out of the contour of the body through opening means formed in the body, head lamp driving means for driving said head lamp means between said retracted and extended positions, lamp cover means provided above the head lamp means and having a front edge inclined rearwards toward laterally outwards, cover mounting means for mounting said lamp cover means on the body for vertical swinging movement between a retracted position wherein it covers the opening means in the body and an extended position wherein it is projected above the contour of the body, cover driving means for driving said lamp cover means so that it is moved together with the head lamp means, said cover mounting means including means for providing a swinging axis below a rear part of said lamp cover means, said swinging axis being inclined rearwards toward laterally outwards, said cover mounting means also including link means having one end secured to said lamp cover means and the other end swingably connected with bracket means on the automobile body through hinge pin means passing through the link means and the bracket means, and sideward shifting means including cam means provided about said hinge pin means between the link means and the bracket means for producing a laterally outward movement in the lamp cover means when the lamp cover means is moved to the extended position.

* * * * *